(12) United States Patent
Nelson et al.

(10) Patent No.: US 7,258,226 B2
(45) Date of Patent: Aug. 21, 2007

(54) SELF-STACKING SPIRAL CONVEYOR WITH MODULAR DRIVE SYSTEM

(75) Inventors: Larry Nelson, Mukilteo, WA (US); Daniel E. Flanagan, Puyallup, WA (US); Robert Muscato, Monmouth Junction, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 95 days.

(21) Appl. No.: 10/962,681

(22) Filed: Oct. 12, 2004

(65) Prior Publication Data

US 2005/0092585 A1 May 5, 2005

Related U.S. Application Data

(60) Provisional application No. 60/511,037, filed on Oct. 14, 2003.

(51) Int. Cl.
*B65G 21/18* (2006.01)
(52) U.S. Cl. .................................................. 198/778
(58) Field of Classification Search .............. 198/778, 198/850, 853
See application file for complete search history.

(56) References Cited

U.S. PATENT DOCUMENTS

| | | | |
|---|---|---|---|
| 3,612,252 A | 10/1971 | Yu | |
| 3,682,295 A | 8/1972 | Roinstad | |
| 3,838,767 A | 10/1974 | Taylor | |
| 3,938,651 A | 2/1976 | Alfred et al. | |
| 4,015,722 A | 4/1977 | Cooper, Jr. et al. | |
| 4,565,782 A | 1/1986 | Olsson et al. | |
| 4,603,776 A | 8/1986 | Olsson | |
| 4,858,750 A | 8/1989 | Cawley | |
| 4,899,871 A | 2/1990 | Olsson | |
| 4,941,567 A | 7/1990 | Olsson et al. | |
| 4,955,465 A | 9/1990 | Straight et al. | |
| 5,031,751 A | 7/1991 | Pahlsson | |
| 5,069,330 A * | 12/1991 | Palmaer et al. ............. | 198/778 |
| 5,105,934 A | 4/1992 | Caley | |
| 5,183,149 A | 2/1993 | Weirman et al. | |
| 5,190,143 A | 3/1993 | Froderberg et al. | |
| 5,228,557 A | 7/1993 | Lago | |
| 5,346,057 A * | 9/1994 | Fisher et al. ................ | 198/778 |
| 5,350,056 A | 9/1994 | Hager | |
| 5,458,228 A | 10/1995 | Olsson | |
| 5,460,260 A | 10/1995 | Ochs et al. | |
| 5,702,245 A | 12/1997 | London | |
| 5,803,232 A | 9/1998 | Froderberg | |
| 5,829,578 A | 11/1998 | Froderberg | |
| 5,911,305 A | 6/1999 | Layne | |
| 6,029,797 A | 2/2000 | Olsson | |
| 6,029,802 A | 2/2000 | Musiari et al. | |
| 6,062,375 A | 5/2000 | Pupp | |
| 6,098,792 A | 8/2000 | Olsson | |
| 6,237,750 B1 | 5/2001 | Damkjaer et al. | |
| 6,315,100 B1 | 11/2001 | Lebedev | |
| 6,695,128 B2 | 2/2004 | Palmaer et al. | |

* cited by examiner

*Primary Examiner*—James R. Bidwell
(74) *Attorney, Agent, or Firm*—Bernard Lau

(57) ABSTRACT

A modular drive system for a self-stacking conveyor belt adapted to travel at least along one non-linear path segment includes at least one drive cassette adapted to removably engage sidelinks on an edge of the conveyor belt, and preferably at least a first drive cassette engaging the conveyor belt sidelinks at an inner curve of the segment and at least a second drive cassette engaging the conveyor belt sidelinks at an outer curve of the segment.

13 Claims, 15 Drawing Sheets

SELF-STACKING SPIRAL CONVEYOR WITH MODULAR DRIVE SYSTEM

CROSS-REFERENCE TO RELATED APPLICATIONS

This application claims the benefit of the filing date of U.S. Provisional Application Ser. No. 60/511,037, filed Oct. 14, 2003.

FIELD OF THE INVENTION

The present invention relates to self-stacking conveyor belt systems useful in freezers.

BACKGROUND

Known self-stacking freezer systems appear, when viewed from above, to resemble a donut, i.e. each tier of the freezer conveyor belt stack providing the "donut's" circumferential shape and defining a "hole" in the center. Sidelinks of the belt are made from various materials and the construction of same and the known freezer systems limit airflow for cooling or freezing(collectively "freezing") of products, such as in particular food products. There has also been to date no economical way to provide for accurate and reliable horizontal and vertical alignment of the tiers when such are being driven for a freezing application. Known freezer systems also include drive assemblies which require the complete cessation of the conveyor belt and therefore the system when the drive assembly must be stopped and removed for maintenance or repair.

Known systems that are made of stainless steel have each of the sidelinks welded to the belt independent of each other. Should damage occur to either a sidelink or the belt, the belt must be removed completely from the freezer system for repair or cut while in the freezer in order to accomplish the repair. The former option is most commonly employed, while the latter is the most dangerous. In either instance, the choice is undesirable due to the entire system having to be shut down and the process being costly, time consuming, unwieldy, unhygienic, and possibly dangerous.

SUMMARY

A spiral or helical conveying system is provided that is used for the conveyance of products and in particular, for conveyance during freezing of food products, although not limited to such application. The system uses improved sub-assemblies that co-act to overcome the disadvantages of known systems and to provide a flexible mechanical freezer for industrial applications. The system provides for improved heat transfer for the products.

A sidelink for a conveyor belt that is adapted to travel along at least one path segment is provided comprising:
  a base portion integral with a support portion;
  the base portion containing means for engaging a drive belt and means for engaging the conveyor belt;
  the support portion configured to accommodate overlap with another support portion of at least one adjacent sidelink in travel along the path and to permit at least one of vertical and horizontal gas flow with respect to the conveyor belt;
  an upper edge of the support portion containing engaging means constructed and arranged to resist displacement of the sidelink by releaseably engaging a corresponding base portion of another sidelink.

A sidelink for a conveyor belt adapted to travel along at least one non-linear path segment is provided comprising:
  a base portion comprising means for engaging a drive belt and means for engaging the conveyor belt;
  a support portion integral with the base portion and constructed and arranged to accommodate overlap at the support portion of at least one adjacent sidelink during travel in the non-linear path segment and to permit at least one of vertical and horizontal flow of fluid with respect to the conveyor belt, the support portion including engaging means capable of resisting displacement of the sidelink with respect to another sidelink.

A sidelink for a conveyor belt is further provided comprising:
  a base portion comprising means for engaging the conveyor belt, means for engaging a drive belt, and means for receiving a complementary portion of an underlying sidelink;
  a support portion integral with the base portion and constructed and arranged to accommodate overlap at the support portion of at least one adjacent sidelink during travel of the conveyor belt and to provide for fluid flow with respect to the conveyor belt, the support portion comprising mating means disposed for releasably engaging an overlying sidelink.

A modular drive for a self-stacking conveyor belt adapted to travel along at least one non-linear path segment is provided comprising a plurality of independent drive cassettes adapted to removably engage an edge of the conveyor belt, at least a first drive cassette engaging the conveyor belt on an inner curve of the non-linear path segment and at least a second drive cassette engaging the conveyor belt on an outer curve of the non-linear path segment.

A modular drive system for a self-stacking conveyor belt adapted to travel along at least one non-linear path segment is provided comprising a plurality of independent drive cassettes adapted to removably engage sidelinks on an edge of the conveyor belt, at least a first drive cassette engaging the conveyor belt sidelinks on an inner curve of the non-linear path segment and at least a second drive cassette engaging the conveyor belt sidelinks on an outer curve of the non-linear path segment.

A modular drive system for a conveyor belt is further provided, comprising at least one sidelink disposed at the conveyor belt; and drive means adapted to demountably attach to a support for the conveyor belt to co-act with the at least one sidelink to effect movement of the conveyor belt.

BRIEF DESCRIPTION OF THE DRAWINGS

The accompanying drawings are included to provide a further understanding of the spiral conveying system and are incorporated herein and constitute a part of this specification. The drawings illustrate various embodiments and, together with the description, serve to explain their features, but are not intended to limit the invention as encompassed by any disclosure or claims forming part of the application.

DETAILED DESCRIPTION

The self-stacking spiral conveyor and modular drive system for the conveyor belt includes two assemblies: a sidelink assembly and a modular drive assembly, which co-act to operate a freezer conveyor belt.

Referring to FIGS. 1-5, the sidelink assembly is shown generally at 10 and is connected by belt cross rods 12 that span the width of belt (not shown), and may be held in place by a retaining ring 14. Though somewhat different in dimensions due to the dissimilar circumferences between the outside of the spiral conveyor and the inside, that is, the outer curve and inner curve respectively of the non-linear travel path of the conveyor belt, sidelinks 20 are installed on both sides of the belt.

Figure 1:
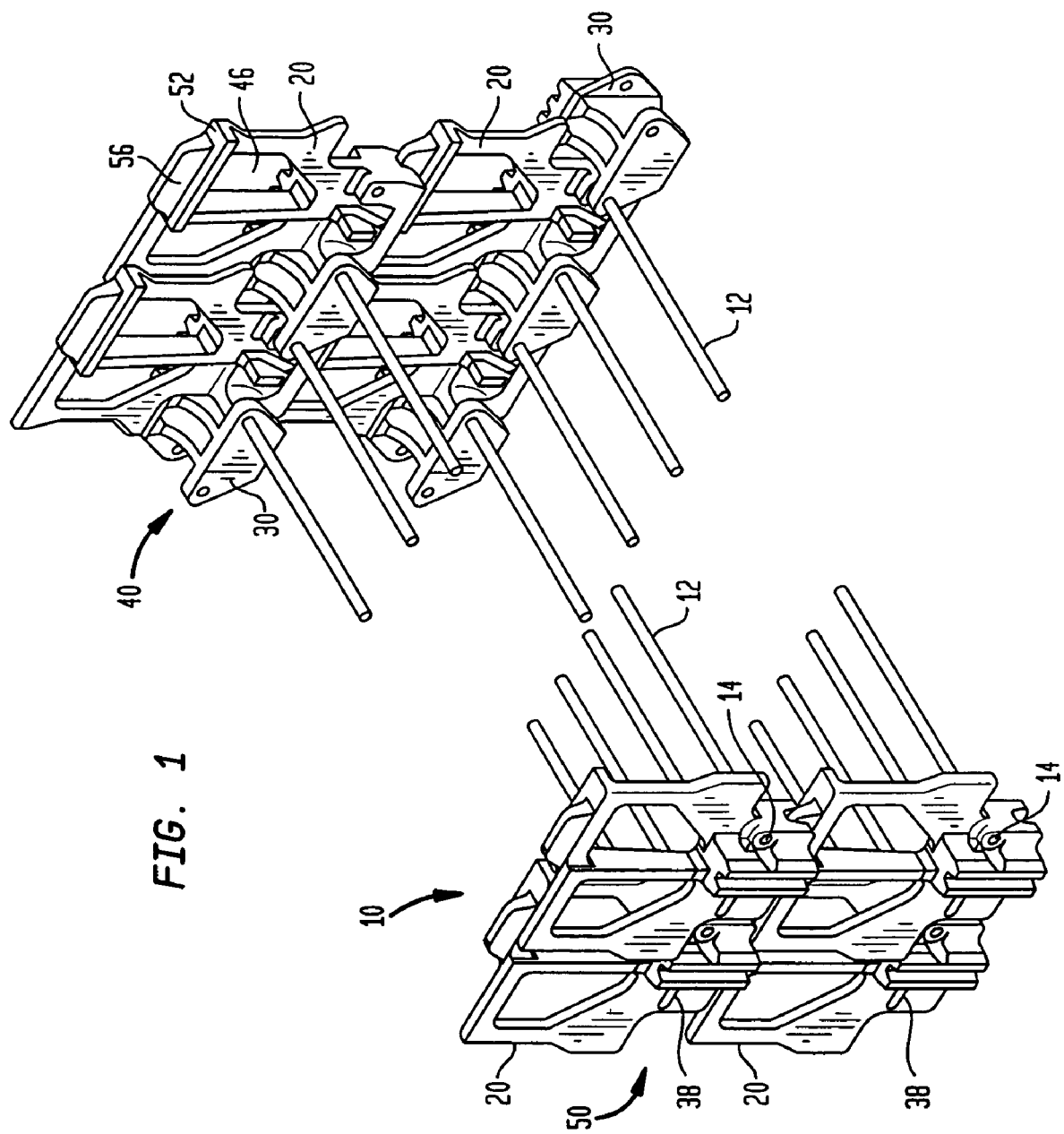
FIG. 1 shows a perspective view of a stacked sidelink assembly and a section of conveyor belt cross rods.
Figure 2:
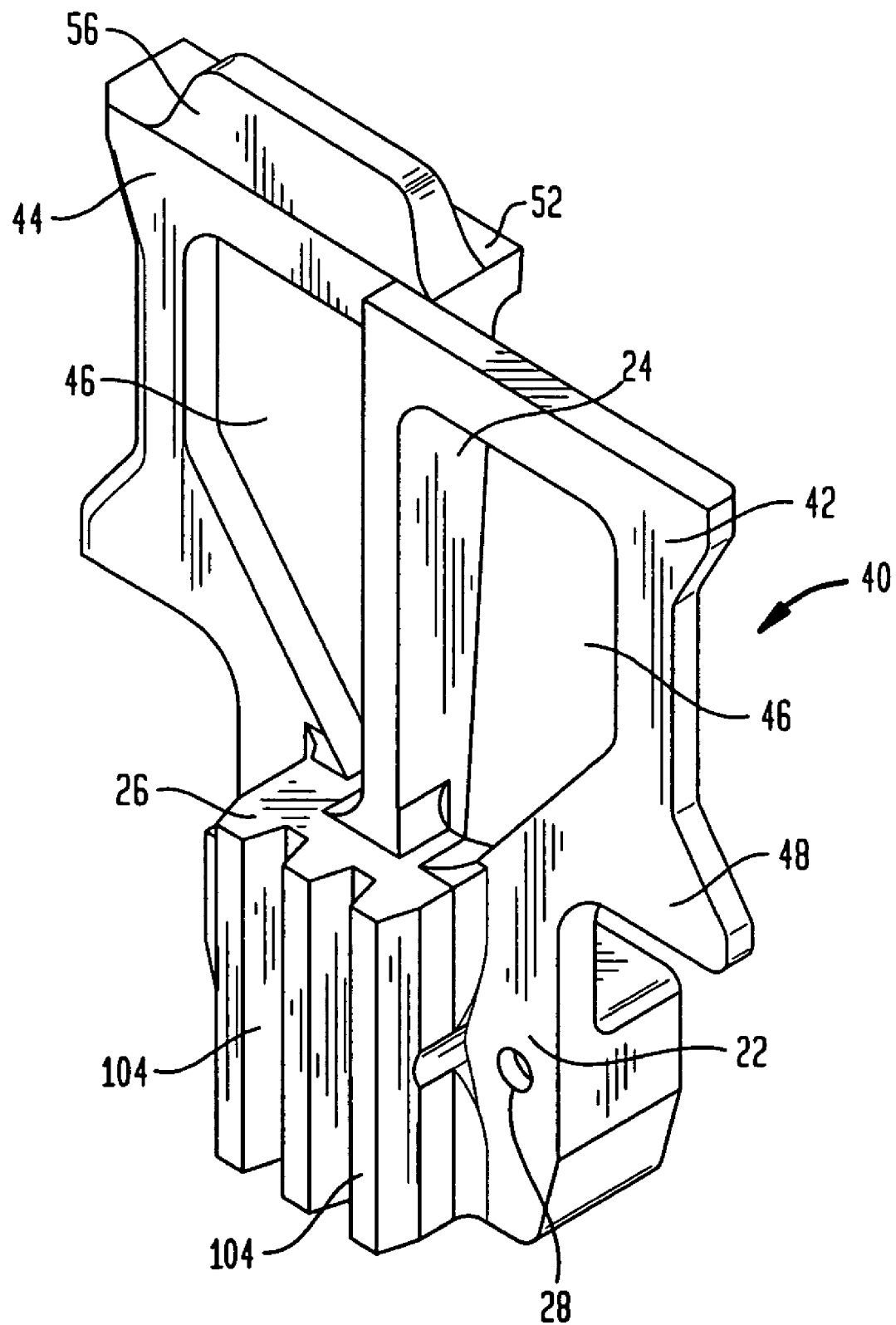
FIG. 2 shows a perspective view of an outside or outer sidelink adapted for horizontal air and/or gas flow.
Figure 3:
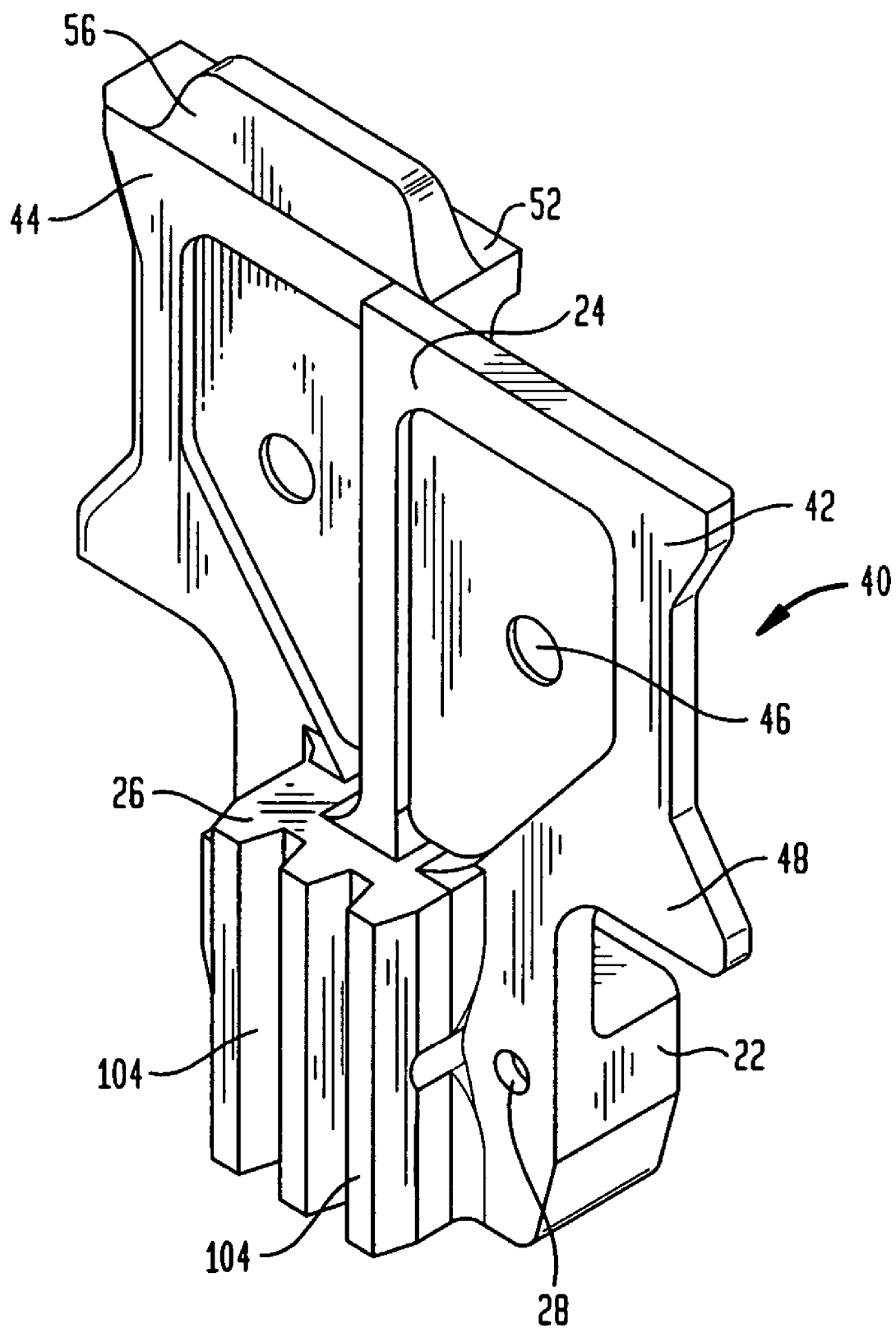
FIG. 3 shows a perspective view of an outer sidelink adapted for vertical air and/or gas flow.
Figure 4:
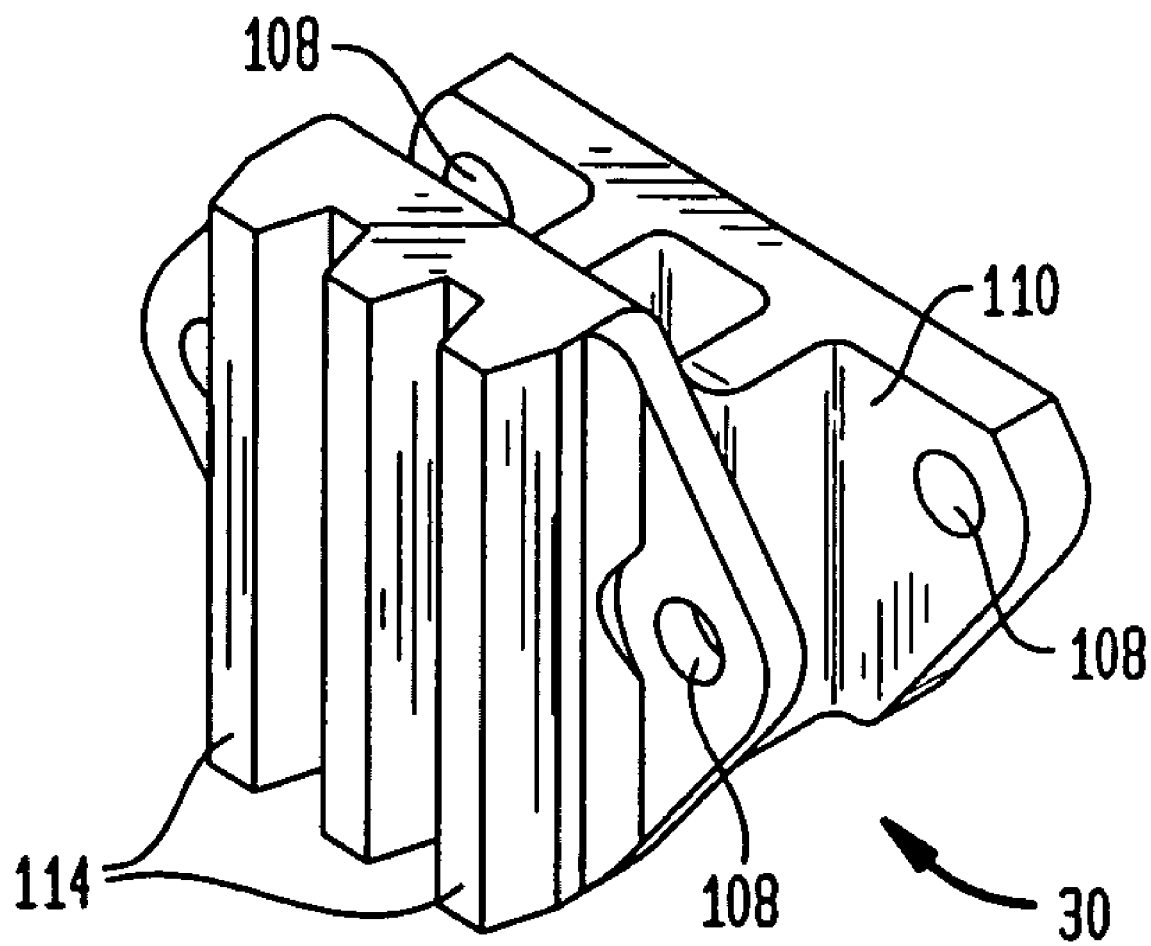
FIG. 4 shows a perspective view of an intermediate drive link.

The self-stacking sidelink assembly comprises the following features: a sidelink 20, which can be configured or molded to accommodate horizontal airflow as shown in FIG. 2 or vertical airflow as shown in FIG. 3; an intermediate drive link 30 depicted in FIG. 4; a belt cross-rod 12; and optionally, a cross-rod retaining ring 14. In certain embodiments, the intermediate drive link 30 is used only on an outer sidelink 40 assembly. In one embodiment, the retainer rings 14 are one-way rings providing lateral resistance, and may be installed under compression.

Because the spiral or helical conveyor is shaped like a donut laying flat on a horizontal surface, there is an outer sidelink 40 assembly and an inner sidelink 50 assembly, which may differ in dimensions due to the difference in the circumference of the outside of the spiral conveyor and that of the inside. Irrespective of the small physical differences between the outer sidelinks 40 and the inner sidelinks 50, there is no difference in how either sidelink functions with respect to the support of overlying tiers of the self-stacking conveyor.

Figure 5:
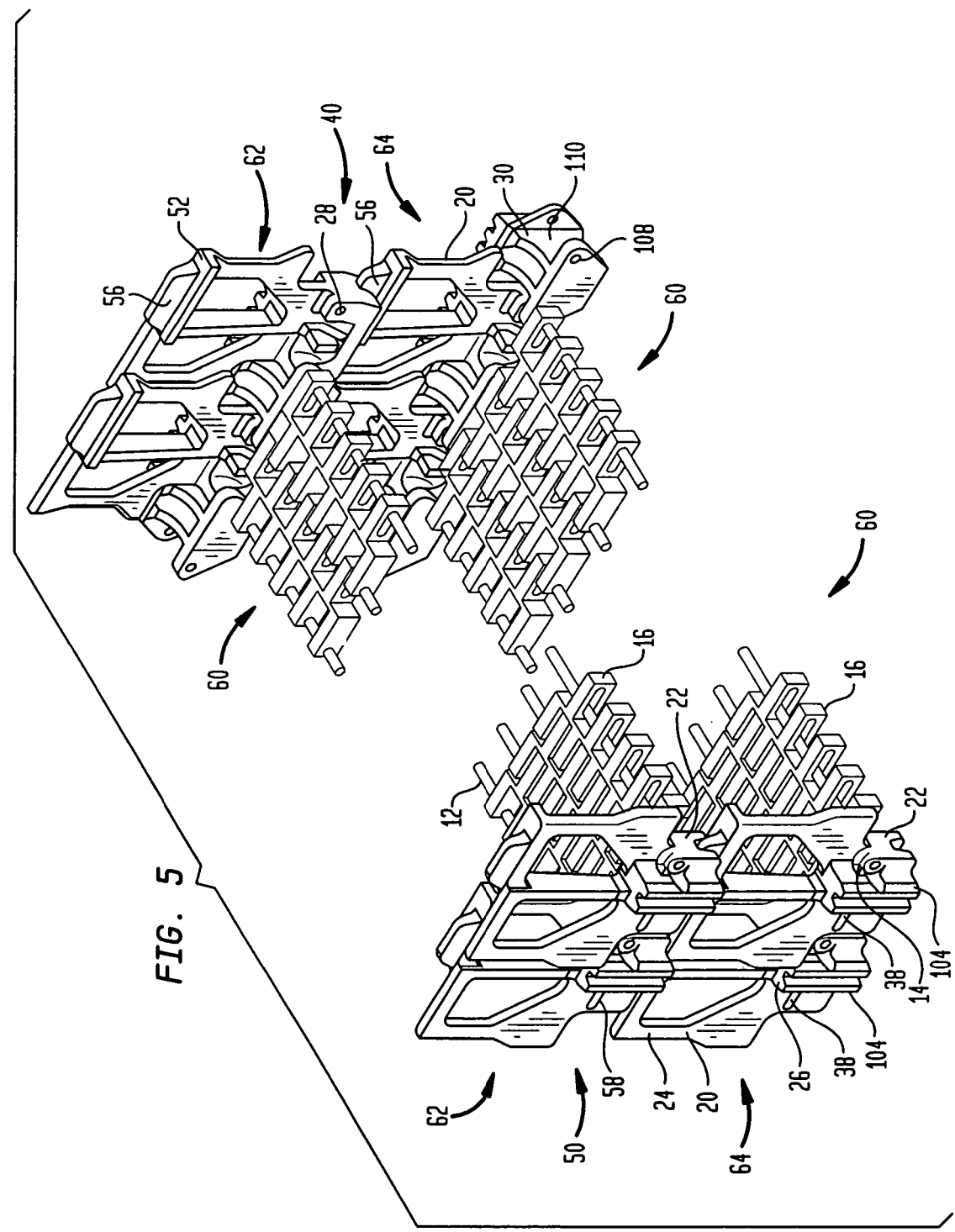
FIG. 5 shows a perspective view of a stacked sidelink assembly engaged with a section of conveyor belt cross rods carrying conveyor belt module components.

Referring to FIGS. 2, 3 and 5, the sidelinks 20 comprise a base portion 22 integral with a support portion 24. The base portion 22 contains sidelink means 26 for engaging a drive belt and means 28 for engaging the conveyor belt 60. As shown also in FIGS. 12 and 16, the support portion 24 is adapted to support at least one sidelink 20 that engages a course 62 of the spiral or helical conveyor in a tier above the course 64 of the conveyor belt 60 that engages the sidelink 20 having the support portion. Conversely, the base portion 22 is also adapted to be supported by the support portion 24 of another sidelink 20 that engages a course 64 of the spiral or helical conveyor in a tier below the course 62 of the conveyor belt 60 that engages the base portion.

In certain embodiments, the sidelink means 26 for engaging the drive belt comprises teeth 104 for releasably engaging (i.e. meshing with) corresponding teeth on a drive belt, to be discussed in more detail below.

The base portion 22 of the sidelinks 20 may have at least one hole 28 for engaging a component of the conveyor belt, such as a conveyor belt cross rod 12, or a component of the conveyor belt functioning as or connected to a conveyor belt cross rod. In certain embodiments, there are two or more holes 28 in the base portion 22 for such a purpose. For outer sidelinks 40, the holes 28 may be sized so as to accommodate the belt cross rod 12 within suitable tolerances. The retainer rings 14 may be used to retain the cross rods 12 in their respective holes 28.

Figure 6:
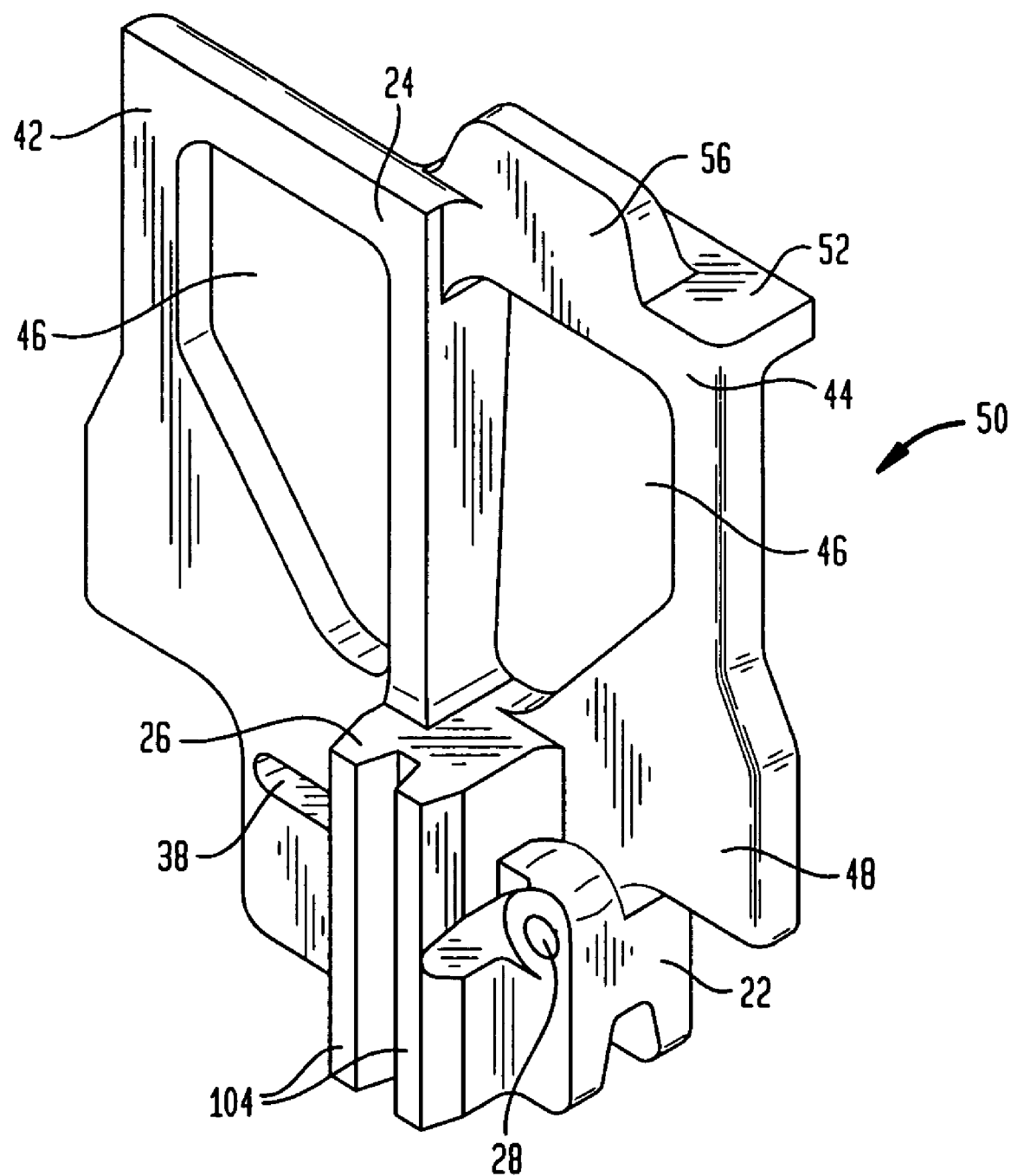
FIG. 6 shows a perspective view of an inside or inner sidelink adapted for horizontal air and/or gas flow.
Figure 8:
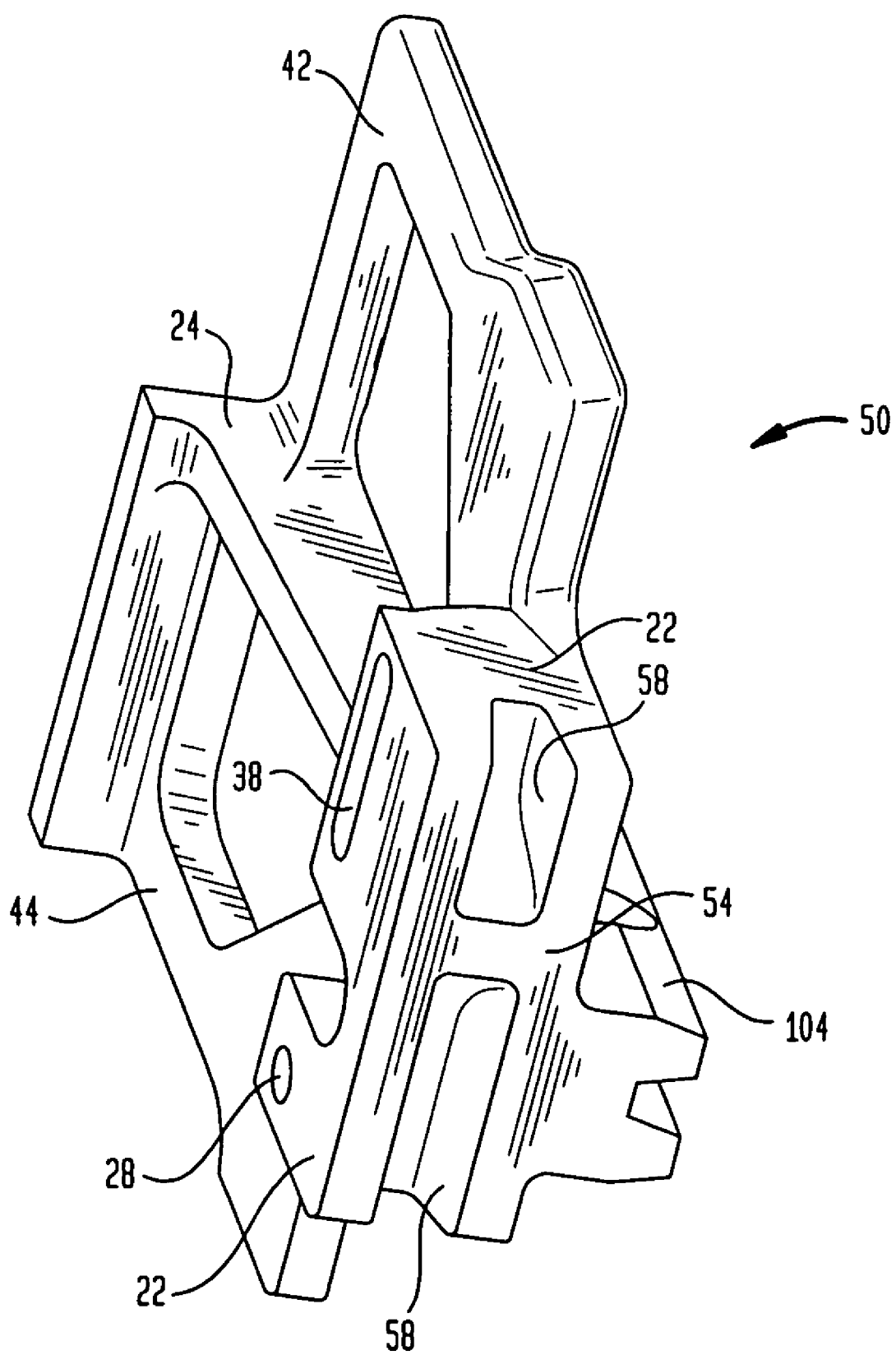
FIG. 8 shows a rotated perspective view of an inner sidelink adapted for horizontal air and/or gas flow.

As shown in FIGS. 6 and 8, the inner sidelinks 50 that are adapted for the interior curve of the non-linear path of the conveyor belt 60, e.g., the spiral, may have a hole 28 dimensioned and for a purpose as discussed above, but may in addition have at least one slot 38, such as an elongated hole, for receiving a component of the conveyor belt, such as the conveyor belt cross rod 12 or an equivalent component as previously discussed, in the slot 38 for sliding engagement therein. The sliding engagement may accommodate the non-linear travel of the conveyor belt 60 on the inner curve 34 of the spiral, thereby permitting the inner sidelinks 50 to be partially displaced with respect to an adjacent sidelink. Such displacement of the inner sidelinks 50 resembles collapsing of the sidelinks 50 toward each other for those sidelinks 50 proximate the apex of the interior curve. For this reason, the support portion 24 of the sidelink may also be configured to accommodate overlap with at least one adjacent sidelink during travel in the non-linear portion of the conveyor path. For example, the support portion 24 may have a first segment 42 that is offset from an adjacent second segment 44, so that the first segment 42 may also be displaced longitudinally (in terms of travel of the conveyor belt) with respect to the second segment 44 of an adjacent sidelink 20 to accommodate non-linear travel. Nevertheless, the first segment 42 and second segment 44 may integrally form the support portion 24, as shown in FIGS. 2 and 3.

The sidelinks 20 may be constructed and arranged to provide for either vertical or horizontal flow of a fluid such as a gas, including for example air, or a combination of both vertical and horizontal flow, across the conveyor. FIG. 2 shows a sidelink 20 having airflow holes 46 therethrough, which permit and facilitate horizontal air and/or gas flow with respect to the food products transported on the conveyor belt 60. Adjacent these openings is an ear portion 48 which provides improved registration with an adjacent sidelink when the conveyor belt compresses at an inner curve. FIG. 3 shows a sidelink 20 that is constructed to permit and facilitate vertical air and/or gas flow with respect to the food products transported on the conveyor belt, on which the airflow holes 46 may be reduced in size or absent.

The sidelinks 20 may be constructed of plastic, for example, but not for purposes of limitation, such as acetal resin, ultra high molecular weight (UHMW) polyethylene resin, or fluorocarbon resin, e.g. TEFLON ® resin (TEFLON being a registered trademark of E.I. du Pont de Nemours and Company).

Figure 7:
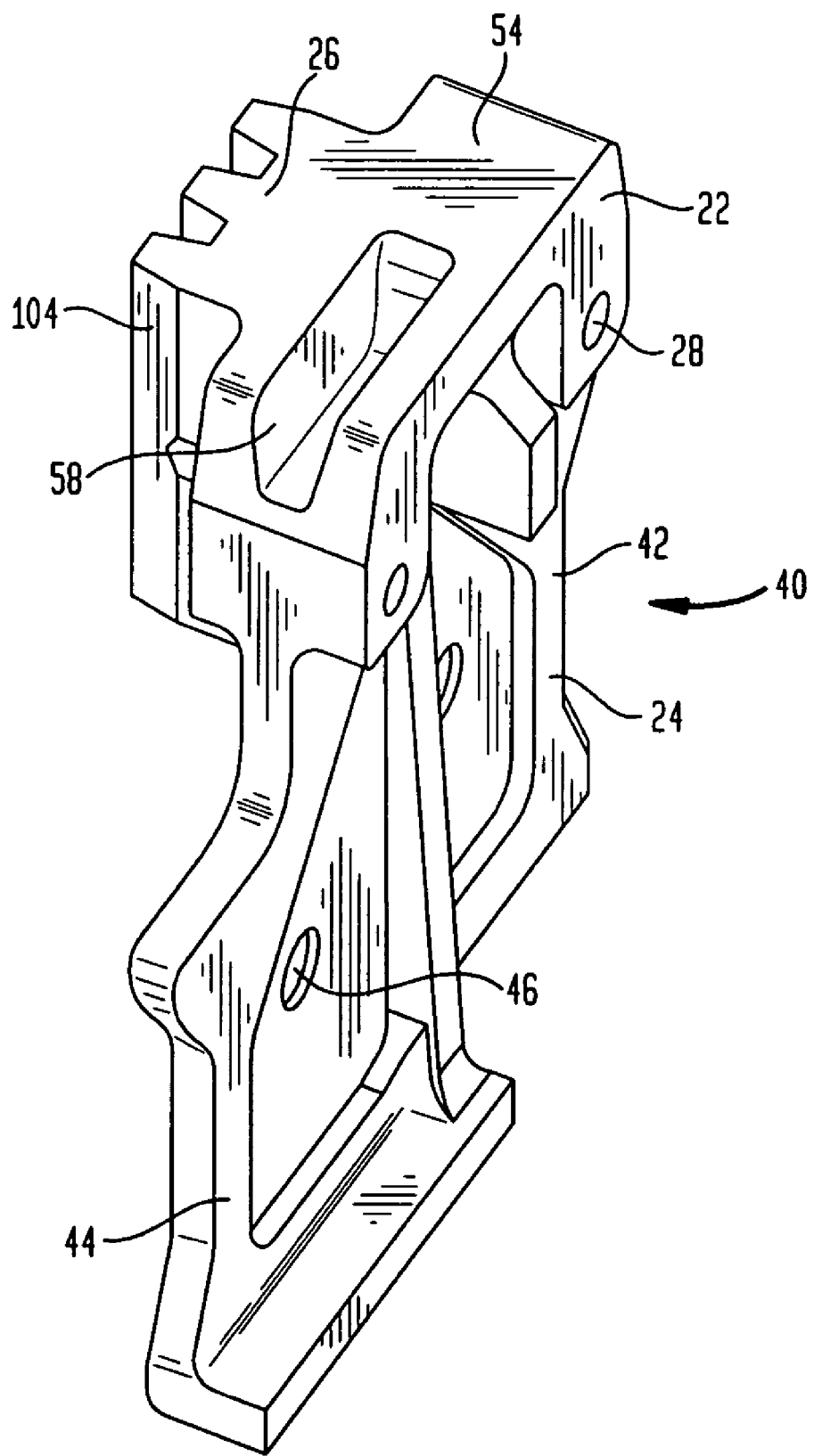
FIG. 7 shows a rotated perspective view of an outer sidelink adapted for vertical air and/or gas flow.
Figure 9:
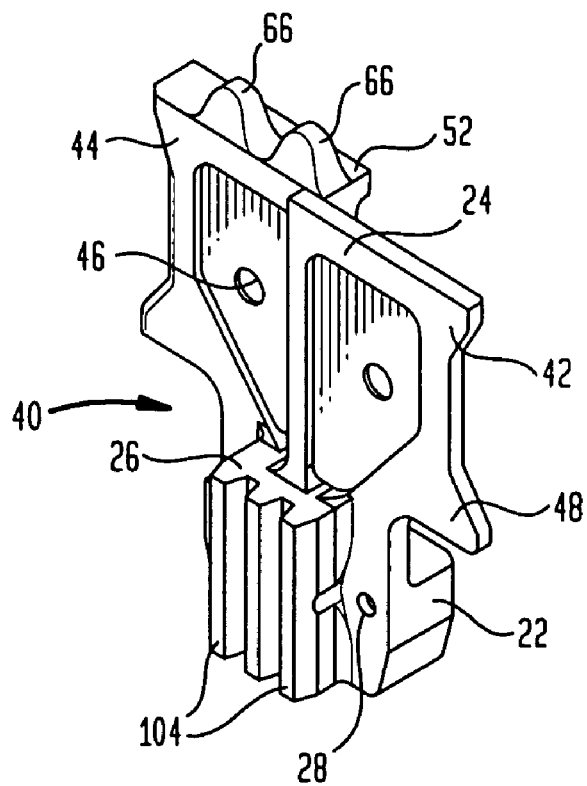
FIG. 9 shows a perspective view of an alternative embodiment of an outside or outer sidelink adapted for vertical air and/or gas flow.
Figure 10:
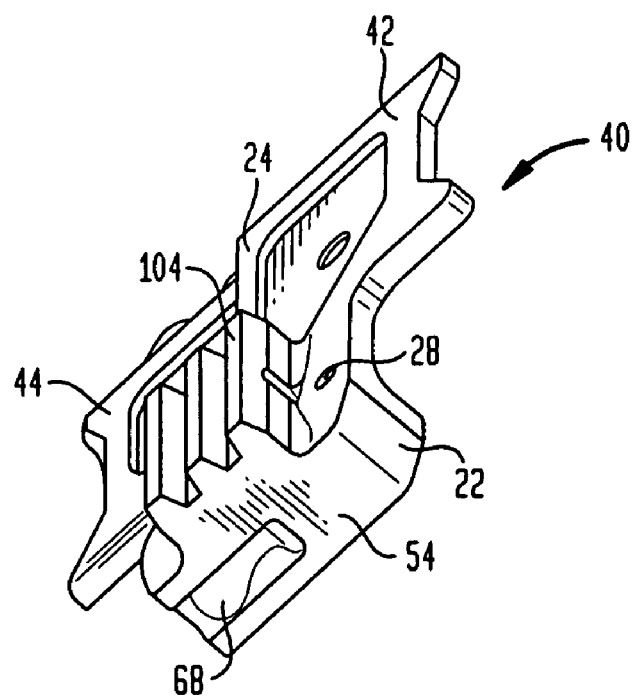
FIG. 10 shows a rotated perspective view of an outer sidelink adapted for vertical air and/or gas flow.

As shown in FIGS. 3 and 6-9, each of the sidelinks 20 may have both a male mating surface 52 and a female mating surface 54 to provide load homogeneity throughout the conveyor belt stack and to optimize stability to minimize the risk of destacking of the system. For example, an upper edge or male mating surface 52 of the sidelink support portion 24 may contain a tab 56 extending from the surface 52 and capable of resisting displacement, such as pivoting of the sidelinks 20, by releasably engaging a slot 58, such as a track or groove, in the female mating surface 54 of the base portion 22 of a sidelink 20 thereabove. The tab 56 may comprise an elongated tongue as shown in FIG. 3, or a plurality of teeth or scallops 66 as shown in FIG. 9, for releasably engaging respectively a corresponding (i.e., complementary) elongated slot 58 such as a track, groove, or a corresponding slot with one or more detents 68 as shown in FIGS. 7 and 10.

The sidelink assembly will accommodate for co-action plastic and stainless steel conveyor belts 60, the two materials most frequently used in food production line conveyance. By way of example only and not for purposes of limitation, the conveyor belt 60 may be a plastic (acetal resin) belt or a stainless steel belt. Various configurations of screens, modules 16 or trays are known as product carrying components of the conveyor belt, and these can be used in conjunction with the modular drive system.

Figure 11:
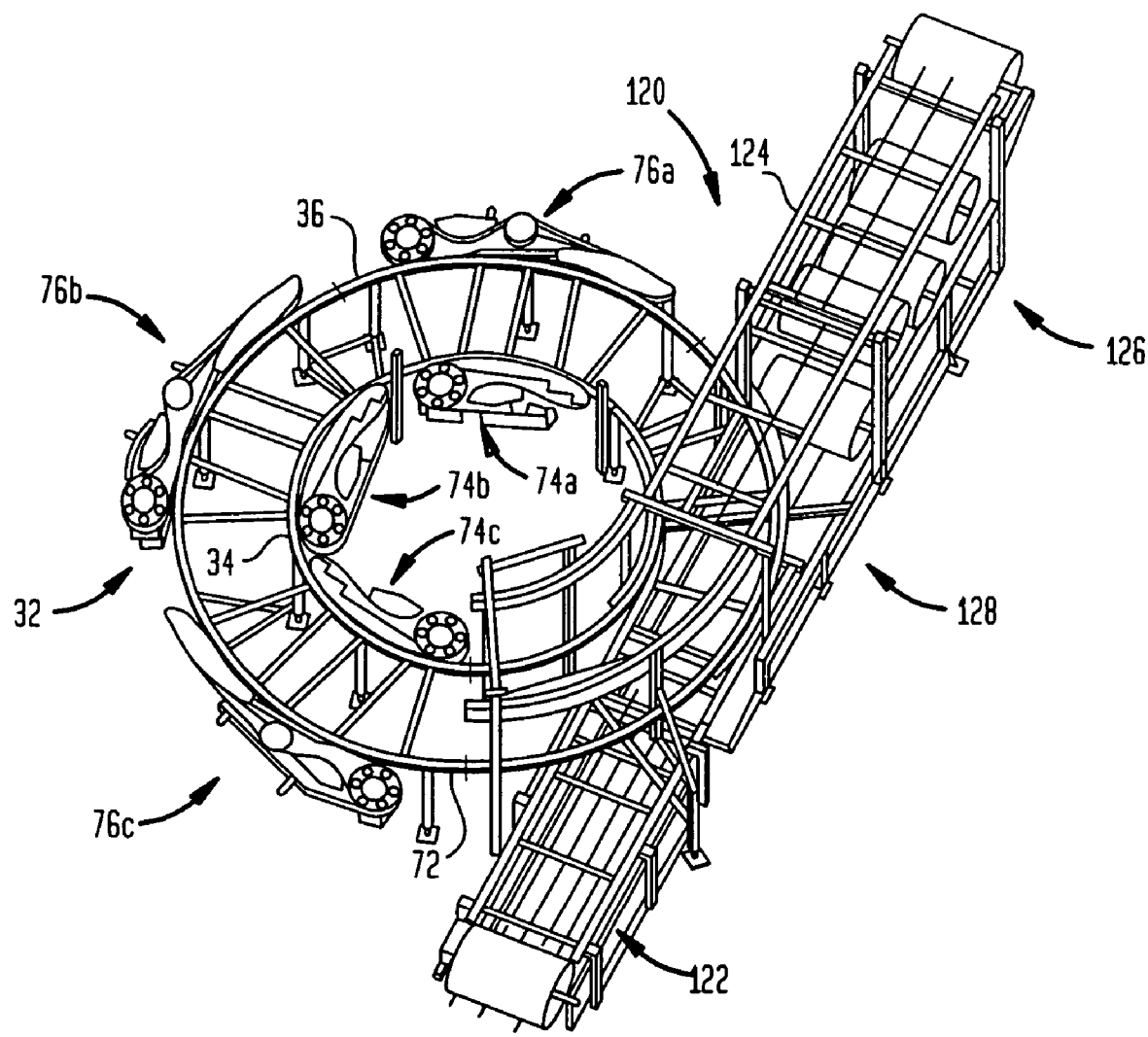
FIG. 11 shows a perspective view of the support fame for a spiral freezer conveyor belt, having pairs of drive cassette modules.

The modular drive apparatus for the conveyor belt 60, which belt is adapted to travel at least along one non-linear path segment 32 such as a spiral or helical path, in one embodiment includes a plurality of independent drive cassettes 74, 76 shown in FIG. 11. The cassettes 74, 76 are adapted to removably engage a support base or frame 72 for the conveyor belt system for co-action with the sidelinks 20 to drive the same and hence the conveyor belt 60. As shown also in FIG. 13, at least a first drive cassette 74 engages the conveyor belt 60 on an inner curve 34 of the non-linear path segment 32, and at least a second drive cassette 76 engages the conveyor belt 60 on an outer curve 36 of the non-linear path segment 32.

Figure 12:
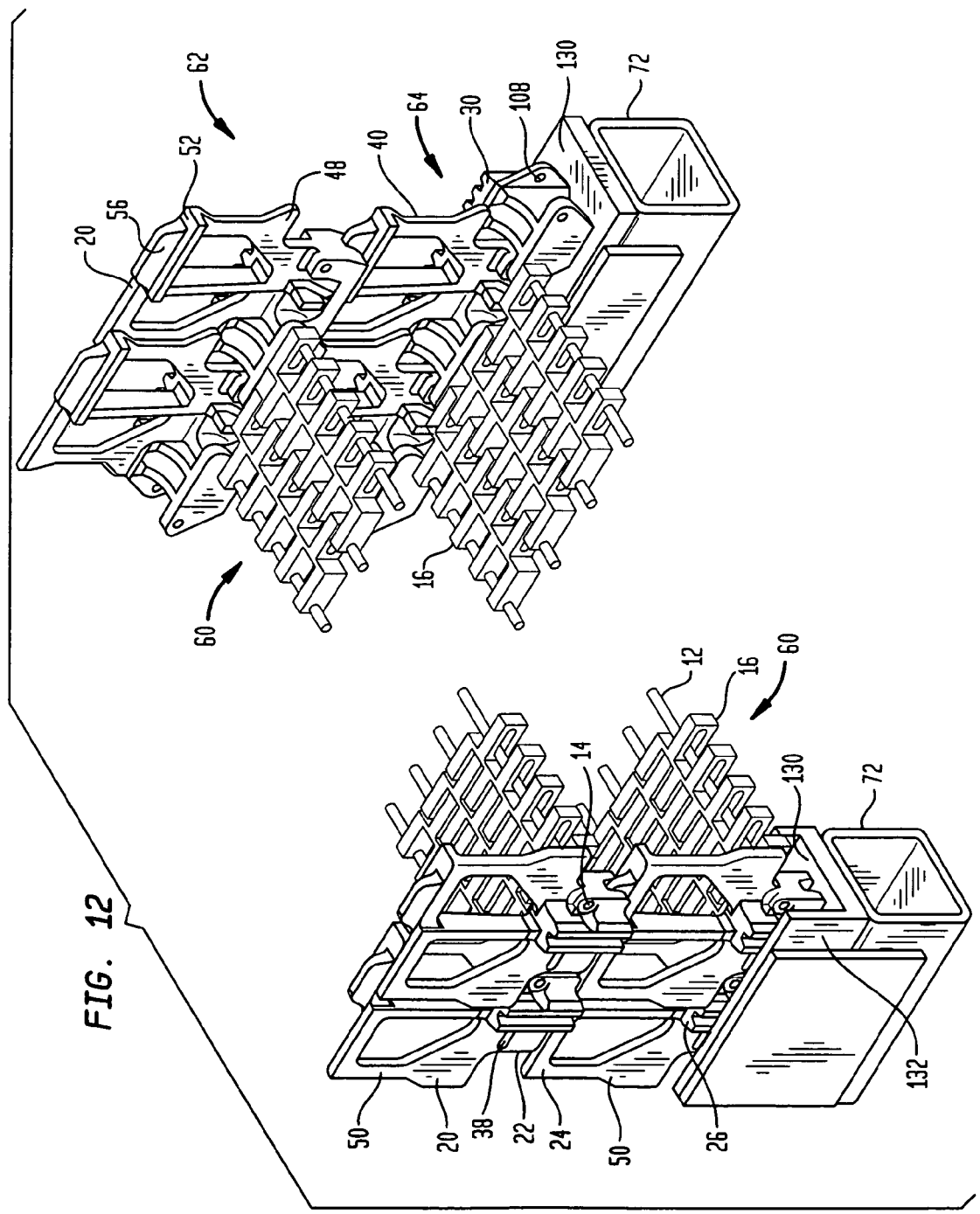
FIG. 12 shows a perspective view of a stacked sidelink assembly engaged with a section of conveyor belt cross rods carrying conveyor belt module components supported on the support frame.

In order to permit ease of operation, cleaning, maintenance and repair, the modular drive cassettes 74, 76 are removably mountable to select positions along the conveyor belt 60. For self-stacking, helical or spiral conveyor belt systems, at least one tier 64 of the conveyor belt 60 is at least partially supported by a support base or frame 72, and the drive cassettes 74, 76 may be removably mounted to the support base or frame 72 as shown in FIGS. 11 and 12.

In one embodiment shown in FIG. 11 by way of example, a first inner drive cassette 74a and a second outer drive cassette 76a comprise a drive pair, disposed substantially directly opposite each other in registration at opposite sides of the conveyor belt 60. In another embodiment shown in FIG. 13, although disposed on opposite sides of the conveyor belt 60, a first drive cassette 74 and a second drive cassette 76 are offset from each other, along or with respect to the length of the conveyor belt (not shown) on the support frame 72.

Referring to the Figures, the modular drive apparatus includes at least one, and in other embodiments, a plurality of electronically controlled drive cassettes 74, 76. For ease of access, the drive cassettes 74, 76 may be installed approximately 36 inches from the underlying surface or floor of the facility, as shown for example in FIG. 11.

In certain embodiments, the drive cassettes 74, 76 are installed in pairs, as shown in FIG. 11. When more than one pair of drive cassettes are used, in certain embodiments the pairs may be positioned substantially equidistant from each other, with respect to the drive cassettes 76 on the outside curve 36 of the spiral conveyor, and those drive cassettes 74 on the inside curve 34.

Figure 14:
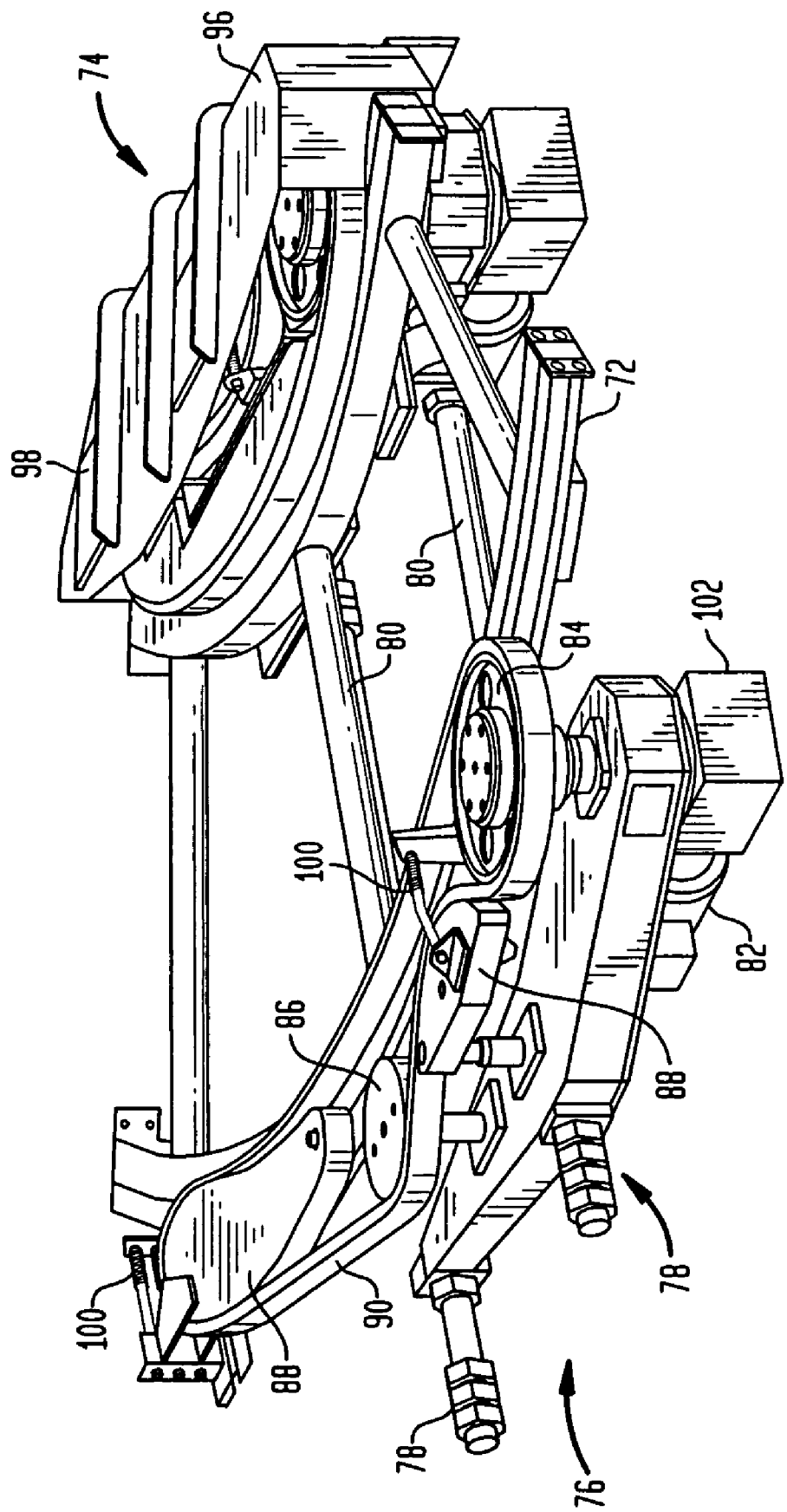
FIG. 14 shows a perspective view of a pair of drive cassette modules, with one cassette module having its cover removed.

Referring also to FIG. 14, the drive cassettes 74, 76 are removably mounted to the support base or frame 72 of the conveyor belt system. When arranged in pairs, the drive cassettes 74, 76 may be in registration with each other at opposite sides of the conveyor as shown in FIGS. 11 and 14, for example. Installation of the drive cassettes 74, 76 at opposed sides of the belt 60 and substantially directly across from (in registration with) each other permits uniform force and tension to be applied to the sidelinks 20 (as discussed below) and hence, to the conveyor belt 60. Each cassette 74, 76 may be driven independently by a dedicated motor 82 or motor gearbox, the speed of each being electronically controlled for efficient and uniform conveyor belt movement. This modularity contributes to the ease of maintenance, repair and replacement.

Figure 13:
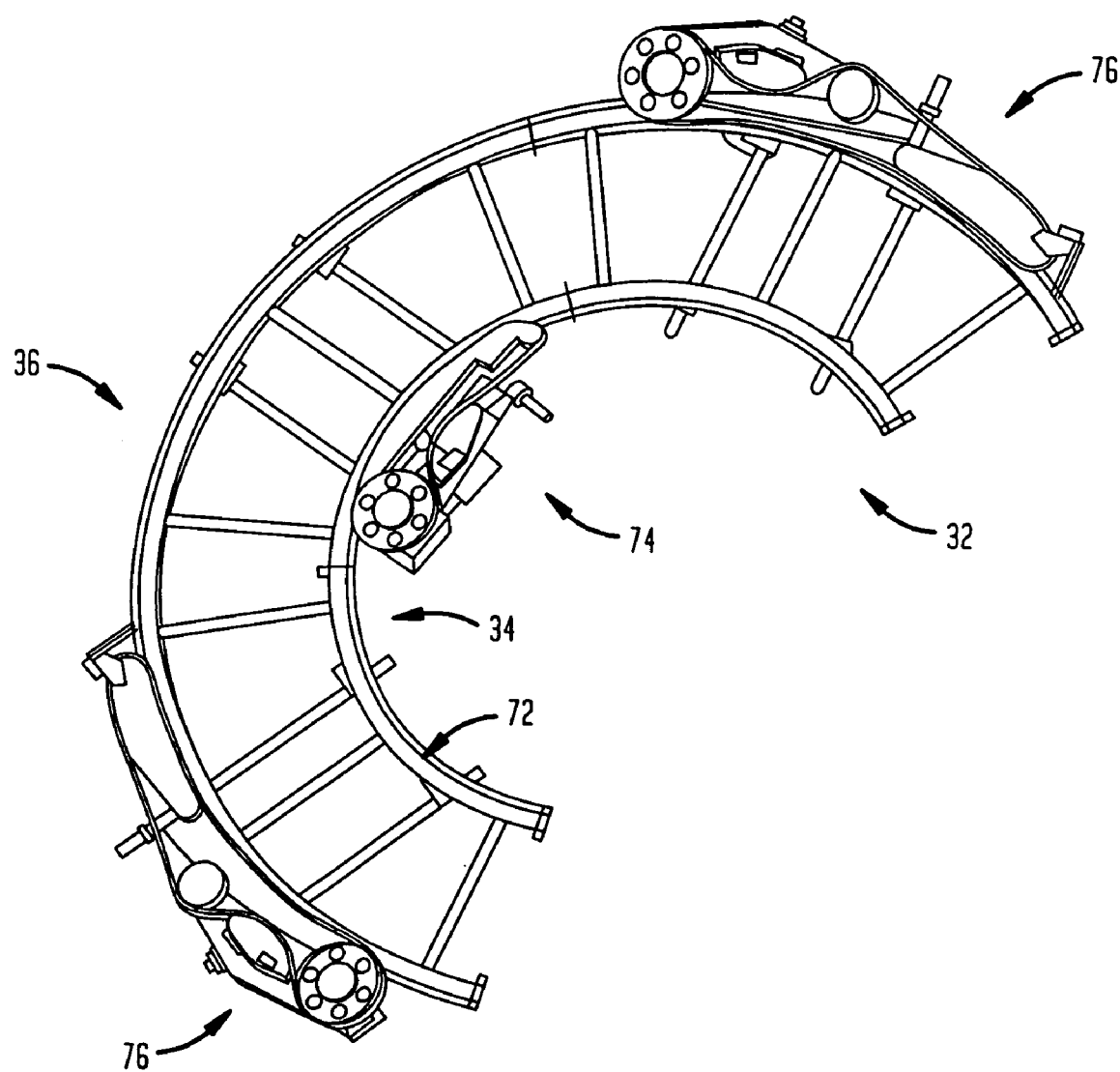
FIG. 13 shows a plan view of a non-linear section of the support fame for a spiral freezer conveyor belt, having an alternative embodiment of offset, engaged drive cassette modules.

Depending upon the production application, the drive cassettes 74, 76 may be installed in offset or staggered, rather than in paired, arrangements, as shown in FIG. 13. Whether in pairs or in offset arrangements, the number of drive cassettes 74, 76 installed in the modular drive system is determined by the width, weight and length of the conveyor belt 60, combined together with the product load to be transported by the belt. For purposes of illustration but not for limitation, one or two pairs (a total of two to four (4) individual drive cassettes), or offset arrangements may be used for light loads, and three or more pairs (a total of six (6) or more total drives) may be used for wider belts and/or heavier loads.

Figure 15:
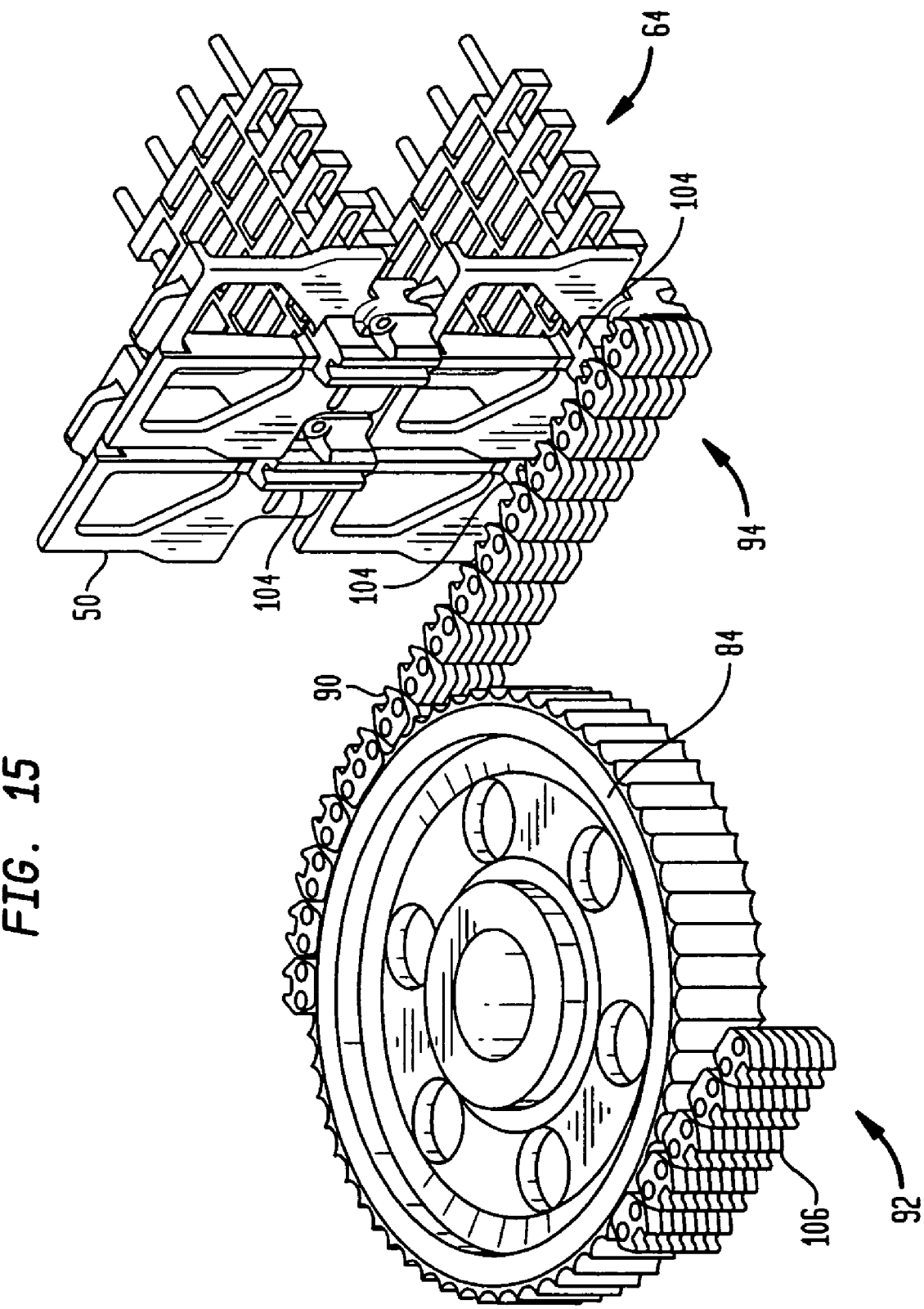
FIG. 15 shows a perspective view of a drive sprocket of a cassette module engaging a section of the drive belt, which also engages a sidelink assembly.

For purposes of illustration but not for limitation, the drive cassettes shown in FIGS. 11, 13 and 14 are approximately five (5) feet in length, with their size determined in large part by the space available. The drive cassettes disposed at the inside of the curve are usually smaller due to the more limited space available at the inside of the curve. The outer drive cassettes are usually larger to maximize co-action between the cassette and the belt, and to better distribute drive load over a larger area. A drive cassette 74, 76 includes a drive motor 82 or motor gearbox, operatively connected to a drive sprocket 84; at least one adjustable, tensioned rotating idler sprocket 86 or guide means 88 such as an adjustable, tensioned, idler block, that keep the drive belt 90 properly engaged with the sidelinks 20; and a drive belt 90 driven by the drive sprocket 84 that has drive teeth arrangements 92, 94 at opposed sides of the belt 90, each of the arrangements in certain embodiments having suitable pitches. In one embodiment, the pitch of teeth on one side of the drive belt is different from the pitch of the teeth on the opposite side of the drive belt. An arrangement of drive teeth 92 at one side of the belt 90 as shown in FIG. 15 is adapted to drive the spiral conveyor belt 60, while the arrangement of drive teeth 94 at the opposed side of the belt is adapted to be driven by the cassette's drive sprocket 84. The drive belt 90 may be made, for purposes of illustration but not limitation, of metal, such as stainless steel, or plastic, such as acetal resin or ultra high molecular weight polyethylene (UHMW). The guide members 88 such as the idler block have smooth surfaces with a low coefficient of friction so that the drive belt 90 can slide over them, and may be made, for purposes of illustration but not limitation, of acetal resin or ultra high molecular weight polyethylene (UHMW). The idler blocks 88 may be biased, using biasing means 100 such as springs and the like.

Each drive cassette 74, 76 may be removably mounted to the conveyor support base or frame 72 by fastening means 78 such as nuts and bolts, and with arms 80 that co-act with complimentary portions of the conveyor support base or frame 72. Alternatively, a pair of drive cassettes 74, 76 at opposed sides of the belt may share common arms 80 spanning the underside of the support frame 72 as shown in FIG. 14. The drive cassette 74, 76 may include a housing 96 or cover. The housing 96 may include a door or hatch 98 for access to drive components, or may be constructed also of two sections that open like a clamshell for such access.

The modular drive system for the conveyor belt therefore includes a plurality of independent drive cassettes adapted to removably engage sidelinks at an edge of the conveyor belt. At least a first drive cassette engages the conveyor belt sidelinks on an inner curve of the non-linear path segment and at least a second drive cassette engages the conveyor belt sidelinks on an outer curve of the non-linear path segment.

Figure 16:
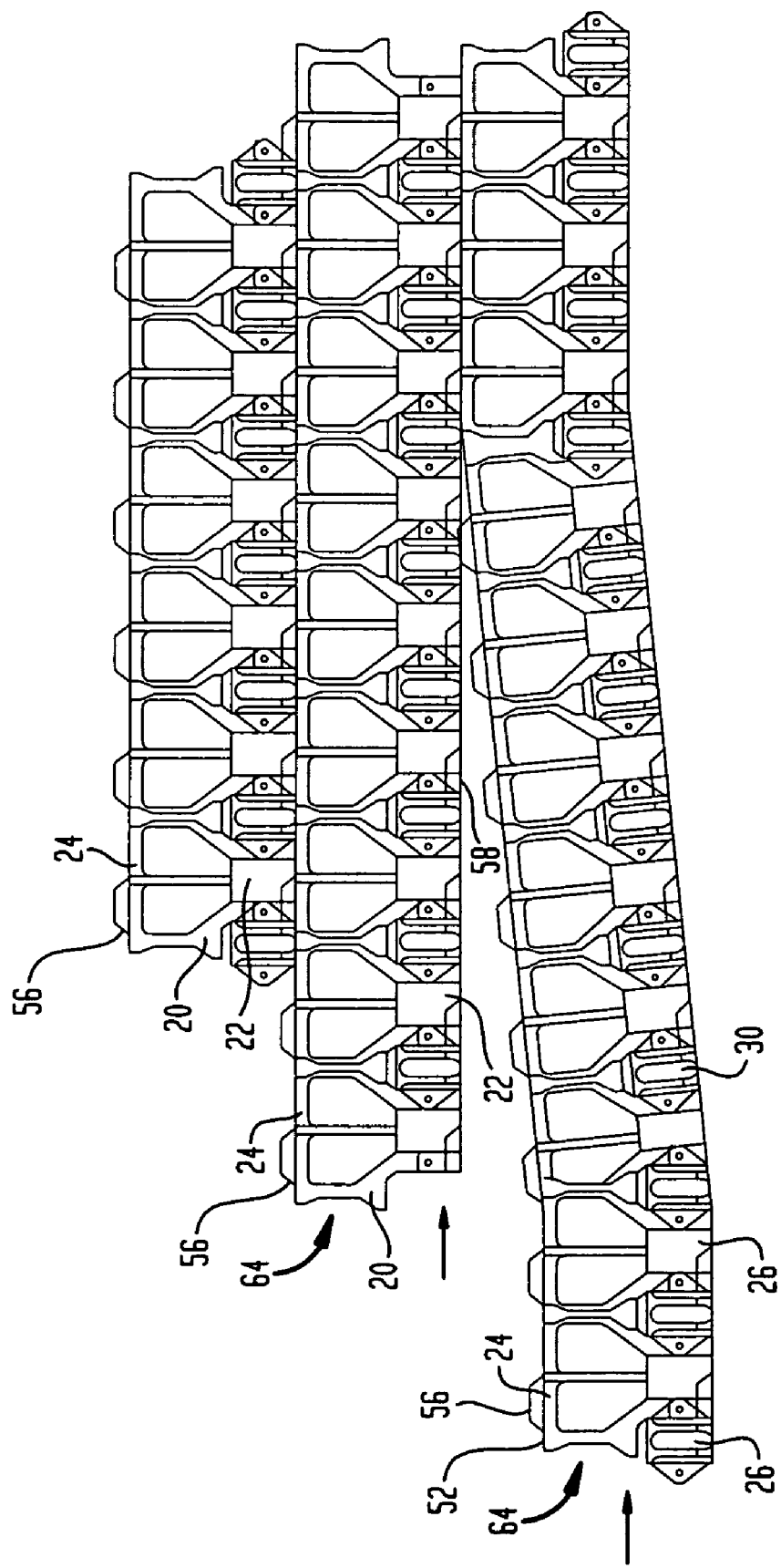
FIG. 16 shows a side elevational view of engaged tiers of sidelinks as the lowest tier engages the tier above it proximate to the infeed section of the conveyor.

Referring to FIG. 15, the drive cassettes 74, 76 each include a drive belt 90 having means 94 for engaging a drive assembly 102 (including a sprocket 84) on the side of the drive belt driven by the drive assembly, and means 92 for engaging the conveyor belt sidelinks 20, on the opposite side of the drive belt. In the modular drive system, the means 92 for engaging the conveyor belt sidelinks 20 on the opposite side of the drive belt 90 may comprise teeth 106 adapted to engage corresponding (that is, complementary) teeth 104 on the sidelinks 20. The sidelinks 20 include teeth 104 integrated into their structure, such as their base portion 22, for the purpose of being driven by the drive belts 90 that are themselves driven by a drive assembly 102 disposed in each drive cassette 74, 76. The sidelinks 20 are thus driven in series by the drive cassettes 74, 76 along the length of travel of the conveyor belt 60, and in embodiments involving helical or spiral conveyor belts, along the length of the travel path of the conveyor belt in the tier 64 engaged by the drive cassettes 74, 76, typically the lowest tier. Referring to FIGS. 3, 4, and 16, in certain embodiments of the modular drive system, the sidelinks 20 that are adapted for travel on the outer curve 36 comprise outer support sidelinks 40 adapted to support at least one upper tier 62 of the conveyor belt 60, and intermediate drive links 30 disposed between adjacent outer support sidelinks 40. The outer support sidelinks 40, as stated above, may include teeth 104 included in their structure, such as at their base portion 22 for the purpose of being driven by the drive belt 90. The intermediate drive links 30 may engage both the adjacent outer support sidelinks 40, in certain embodiments having a "U" shaped portion 110 that engages a side edge of the adjacent sidelink's base portion 22, and a component of the conveyor belt, such as one or more cross rods 12, having a hole 108 to receive the component. Similar to the support sidelinks 20, the intermediate drive link 30 may include teeth 114 integrated into their structure for releasably engaging teeth of the drive belt 90 for being driven by the belt.

Referring to FIGS. 11, 12 and 16, the conveyor belt 60 containing the sidelinks 20 discussed above, when installed in a spiral freezer, enters the spiral freezer at the infeed section 122. From a position at the first tier 64 such as that shown in FIG. 16, it can be seen that the tab 56 extending from the sidelink's male bearing surface 52 on its support portion 24 releasably engages or mates with the slot 58 in the female surface 54 in the base portion 22 of the sidelink 20 of the tier 62 above, to form the stacked configuration shown in FIGS. 1, 5 and 12.

The helical or spiral conveyor can be operated in a continual state of movement, either ascending or descending, depending upon the production line requirements. As the conveyor's sidelinks ascend into the tier above it on both sides of the belt, each sidelink is "captured" by the sidelink above it with the vertical mating surface 56, 66 designed into each sidelink 20 in effect augmenting the alignment and propulsion of the drive system by "pulling" the sidelinks 20 on the tier above.

At about the time the mating surfaces 52, 54 of the upper and lower sidelinks are releasably engaging, the lower sidelink's base portion drive teeth 104 on both sides of the conveyor belt and drive teeth 114 of the affixed intermediate drive links 30 (optionally on the outer curve 36 of the conveyor belt) are also beginning to releasably engage the drive belts 90 of the first pair of drive cassettes 74a, 76a, becoming integrated with the rest of the spiral conveyor. Once this has occurred, the newly coupled lower sidelinks become a first tier 64 component of the continuous conveyor belt, and move forward on a low friction surface, 130 such as a graphite, TEFLON® fluorocarbon, or ultra high molecular weight (UHMW) polyethylene surface, shown generally in FIG. 12, at the beginning of their travel through the spiral.

As shown in FIG. 12, the first tier 64 of the conveyor belt 60 may be stabilized in part by an elevated rail 132 built on the inside circumference of the lower support base structure 72. The rail may bring the tier 64 into registration and provides consistent stabilization of the first tier 64. The rail 132 does not interfere with the drive belts and is generally absent from the area where the drive cassettes 74, 76 are present. The entire spiral conveyor is extremely stable due to the very positive "mating" characteristics of the sidelinks 20 and the releasable engagement of the tiers of the conveyor belt. The sidelinks 20 provide a strong, reliable connection throughout the stack. This connection, strengthened by the conveyor belt cross rods 12 and sidelink assembly, provides the self-stacking conveyor belt with great stability. Near the outfeed section 124 of the spiral conveyor, the uppermost tier 62 of the belt simply disengages and lifts away from the tier beneath it, due to the releasably engageable construction of the sidelinks 20, and continues through the take-up assembly 126 which compensates for overall conveyor belt slack which may accumulate during transport through the freezer. This outfeed section 124 of the belt is no longer within the spiral and continues through the return path 128 to the infeed section 122 as shown in FIG. 11 where it is again positioned to become releasably engaged or mated to the spiral as the bottom tier 64 of the stack.

The modular drive system can be used in conjunction with the self-stacking conveyor belt in cryogen or mechanical freezing applications. The configuration of the sidelinks can be adapted as discussed above to permit horizontal, vertical, or a combination of horizontal and vertical air and/or gas flow across or through the spiral conveyor.

Although the invention has been described in detail through the above detailed description and the preceding examples, these examples are for the purpose of illustration only and it is understood that variations and modifications can be made by one skilled in the art without departing from the spirit and the scope of the invention. It should be understood that the embodiments described above are not only in the alternative, but can be combined.

What is claimed is:

1. A sidelink for a conveyor belt adapted to travel along at least one path segment comprising: a base portion integral with a support portion; the base portion containing means for engaging a drive belt and means for engaging the conveyor belt; the support portion configured to accommodate overlap with another support portion of at least one adjacent sidelink in travel along the path and to permit at least one of vertical and horizontal gas flow with respect to the conveyor belt; an upper edge of the support portion containing engaging means constructed and arranged to resist displacement of the sidelink by releasably engaging a corresponding base portion of another sidelink.

2. The sidelink of claim 1, wherein the conveyor belt is adapted to travel along both at least one linear path segment and at least one non-linear path segment.

3. The sidelink of claim 1, wherein the means for engaging the drive belt comprises teeth for co-acting with corresponding teeth on the drive belt.

4. The sidelink of claim 1, adapted for a helical conveyor belt.

5. The sidelink of claim 4, wherein the support portion is adapted to support another sidelink disposed to engage a course of the helical conveyor above a course of the conveyor belt engaging the support portion.

6. The sidelink of claim 4, wherein the base portion is adapted to be supported by another support portion of another sidelink engaging a course of the helical conveyor belt from below the course of the conveyor belt engaging the base portion.

7. The sidelink of claim 1, wherein the engaging means comprises at least one of an elongated tongue and a plurality of teeth for releasably engaging respectively a complementary receiving means of another sidelink.

8. The sidelink of claim 7, wherein the receiving means comprises at least one of a corresponding elongated slot, track and a corresponding plurality of detents.

9. The sidelink of claim 1, adapted to engage an intermediate drive link, the intermediate drive link having means for co-acting with the drive belt, optionally teeth for releasably engaging corresponding teeth on the drive belt.

10. The sidelink of claim 1, comprising at least one hole for engaging a component of the conveyor belt.

11. The sidelink of claim 1 adapted for the inner curve of the non-linear path of the conveyor belt having at least one slot for slidingly engaging a component of the conveyor belt.

12. A sidelink for a conveyor belt adapted to travel along at least one non-linear path segment, comprising: a base portion comprising means for engaging a drive belt and means for engaging the conveyor belt; a support portion integral with the base portion and constructed and arranged to accommodate overlap at the support portion of at least one adjacent sidelink during travel in the non-linear path segment and to permit at least one of vertical and horizontal flow of fluid with respect to the conveyor belt, the support portion including engaging means capable of resisting displacement of the sidelink with respect to another sidelink.

13. A sidelink for a conveyor belt, comprising: a base portion comprising means for engaging the conveyor belt, means for engaging a drive belt, and means for receiving a complementary portion of an underlying sidelink; a support portion integral with the base portion and constructed and arranged to accommodate overlap at the support portion of at least one adjacent sidelink during travel of the conveyor belt and to provide for fluid flow with respect to the conveyor belt, the support portion comprising mating means disposed for releasably engaging an overlying sidelink.

* * * * *